United States Patent
Yagyuu et al.

(10) Patent No.: US 7,860,049 B2
(45) Date of Patent: Dec. 28, 2010

(54) METHOD FOR CONTROLLING COMMUNICATION ROUTE OF WIRELESS MULTI-HOP NETWORK SYSTEM AND COMMUNICATION TERMINAL

(75) Inventors: Tomohiko Yagyuu, Tokyo (JP); Masahiro Jibiki, Tokyo (JP)

(73) Assignee: NEC Corporation, Tokyo (JP)

( * ) Notice: Subject to any disclaimer, the term of this patent is extended or adjusted under 35 U.S.C. 154(b) by 140 days.

(21) Appl. No.: 11/720,517

(22) PCT Filed: Nov. 30, 2005

(86) PCT No.: PCT/JP2005/021987

§ 371 (c)(1), (2), (4) Date: May 30, 2007

(87) PCT Pub. No.: WO2006/059643

PCT Pub. Date: Jun. 8, 2006

(65) Prior Publication Data

US 2008/0186907 A1 Aug. 7, 2008

(30) Foreign Application Priority Data

Nov. 30, 2004 (JP) ............................. 2004-346360

(51) Int. Cl.
- H04W 4/00 (2009.01)
- H04L 12/28 (2006.01)
- H04B 7/00 (2006.01)

(52) U.S. Cl. .................. 370/328; 370/329; 370/351; 455/422.1; 455/41.2; 455/41.3

(58) Field of Classification Search .............. 370/328, 370/329, 351; 455/445, 41.2, 41.3, 422.1
See application file for complete search history.

(56) References Cited

FOREIGN PATENT DOCUMENTS

| | | | |
|---|---|---|---|
| JP | 2001-148714 A | 5/2001 |
| JP | 2001-230776 A | 8/2001 |
| JP | 2003-284114 A | 10/2003 |
| JP | 2004-159336 A | 6/2004 |
| JP | 2005-537762 A | 12/2005 |
| WO | WO 2004/023241 A2 | 3/2004 |

OTHER PUBLICATIONS

T. Clausen et al., "Optimized Link State Routing Protocol (OLSR)", IETF RFC 3626, Oct. 2003, pp. 1-55.
R. Ogier et al., "Topology Dissemination Based on Reverse-Path Forwarding (TBRPF)", IETF, RFC 3684, Feb. 2004, pp. 1-34.
Atsushi Iwata et al., "Scalable Routing Strategies for Ad-Hoc Wireless Networks", IEEE JSAC, Aug. 1999, vol. 17, No. 8, p. 1369-1379.
Zygmunt J. Haas et al., "Gossip-Based Ad Hoc Routing", IEEE INFOCOM 2002, 2002, p. 1-10.

*Primary Examiner* — George Eng
*Assistant Examiner* — Wesley L Kim
(74) *Attorney, Agent, or Firm* — Sughrue Mion, PLLC

(57) ABSTRACT

A wireless multi-hop network is formed by exchanging a control message including a HELLO message and a topology message between a plurality of communication terminals. A communication terminal adjusts a control message transmission interval so as to reduce the control load according to its movement state and transmits a control message at a longer transmission interval as the movement becomes smaller. Moreover, when link information is updated, the communication terminal includes the sequence number of the HELLO message in the topology message transmitted. Thus, it is possible to realize stable communication in accordance with a movement characteristic with a small message transmission frequency.

16 Claims, 12 Drawing Sheets

FIG.3

HELLO MESSAGE

| MESSAGE TYPE | EFFECTIVE PERIOD | MESSAGE SIZE | |
|---|---|---|---|
| TTL | HOP COUNT | SEQUENCE NUMBER | |
| FLAG | BROADCAST INTERVAL | WILLINGNESS | |
| DB SIGNATURE | | | |
| NEIGHBORING NODE INFORMATION | | | |
| ... | | | |
| NEIGHBORING NODE INFORMATION | | | |

FIG.4

TOPOLOGY MESSAGE

| MESSAGE TYPE | EFFECTIVE PERIOD | MESSAGE SIZE | |
|---|---|---|---|
| TTL | HOP COUNT | SEQUENCE NUMBER | |
| TOPOLOGY SEQUENCE NUMBER | | FLAG | |
| LINK INFORMATION HELLO SEQUENCE NUMBER | | | |
| ... | | | |
| LINK INFORMATION HELLO SEQUENCE NUMBER | | | |

FIG.8

23: NEIGHBORING NODE TABLE OF NODE 45

| NODE ID | HELLO SEQUENCE NUMBER |
|---|---|
| NODE 41 | 80 |
| NODE 44 | 150 |

FIG.9

24: TOPOLOGY TABLE OF NODE 45

| NODE ID | HELLO SEQUENCE NUMBER |
|---|---|
| NODE 41 | 80 |
| NODE 44 | 150 |

FIG.10

23: NEIGHBORING NODE TABLE OF NODE 45

| NODE ID | HELLO SEQUENCE NUMBER |
|---|---|
| NODE 41 | 100 |
| NODE 44 | 200 |

FIG.11

23: NEIGHBORING NODE TABLE OF NODE 45

| NODE ID | HELLO SEQUENCE NUMBER |
|---|---|
| NODE 44 | 200 |

FIG.12

LINK INFORMATION IN TOPOLOGY MESSAGE
BROADCASTED BY NODE 45

| NODE ID | HELLO SEQUENCE NUMBER |
|---------|----------------------|
| NODE 41 | 80 |
| NODE 44 | 150 |

FIG.13

LINK INFORMATION IN TOPOLOGY MESSAGE
BROADCASTED BY NODE 42

| NODE ID | HELLO SEQUENCE NUMBER |
|---------|----------------------|
| NODE 41 | 104 |
| NODE 43 | 300 |

FIG.14

LINK INFORMATION IN TOPOLOGY MESSAGE
BROADCASTED BY NODE 45

| NODE ID | HELLO SEQUENCE NUMBER |
|---------|----------------------|
| NODE 44 | 200 |

METHOD FOR CONTROLLING COMMUNICATION ROUTE OF WIRELESS MULTI-HOP NETWORK SYSTEM AND COMMUNICATION TERMINAL

TECHNICAL FIELD

The present invention relates to a communication route control method for a wireless multi-hop network system and a communication terminal and, more particularly, to a communication route control method and a communication terminal adapted for a movement characteristic of a communication terminal serving as a node on a wireless multi-hop network.

BACKGROUND ART

There is known a wireless network called "wireless multi-hop network (also referred to as "mobile ad-hoc network")". In this wireless network, not only that communication terminal pairs directly communicate with each other by wireless signals, but also that a one first communication terminal can communicate with a one second communication terminal located outside the area that the wireless signal of the one first terminal can reach. This wireless communication is achieved using other adjacent communication terminals as data relay nodes of the wireless network.

Thus, the wireless multi-hop network is constituted by a plurality of communication terminals in a self-organizing manner. Further, the communication terminals each have a router function and thereby can perform data relay. As a routing protocol that controls a communication route of the data relay, the followings are known. One is a Reactive type protocol that searches for a communication route so as to determine it at a communication start time. The other is a Proactive type protocol that exchanges information with adjacent communication terminals in a non-communication time to thereby previously determine a communication route. Hereinafter, a Proactive type wireless multi-hop network using the Proactive type protocol will be described.

In a conventional communication route control method for the Proactive type wireless multi-hop network, periodic exchange of a neighbor detection message (referred to as "HELLO" message) is performed and, thereby, the existence of neighboring communication terminals is grasped. Subsequently, a topology message including link information between a plurality of neighboring communication terminals is periodically notified throughout the network. This allows each communication terminal to build a network topology graph to thereby grasp the topology (information indicating connection state between respective communication terminals) of the entire network. Then, the shortest route is calculated based on the topology. In this manner, the communication route control is realized.

Such a method is disclosed in the following Non-Patent Document 1. However, a message needs to be frequently transmitted in this method, resulting in a high message load, so that it is impossible to use this method in a wireless network exhibiting lower bandwidth capability. Further, the frequent message transmission consumes power significantly, which may shorten a power supply life. Further, the message transmission frequency is determined by the movement speed of a communication terminal. Therefore, in a network constituted by communication terminals having different movement speed, the transmission frequency needs to be adjusted to a communication terminal exhibiting the highest movement speed, consuming unnecessary bandwidth. Moreover, in the case where a given communication terminal moves at a higher speed than expected, update of the network topology cannot keep up with demand, inhibiting normal route control.

As a countermeasure against the above problem, the following Non-Patent Document 2 discloses a method in which only a difference in a change in the communication route is transmitted so as to suppress the message load. However, the transmission frequency itself has not been improved also in this method, so that the power consumption of the terminal cannot be suppressed.

Further, in order to suppress the message load, it can be considered that the transmission frequency is lowered. However, when the transmission frequency is lowered, it takes time to update the neighboring terminal information and network topology information, with the result that communication becomes unstable. In order to overcome the above disadvantage, a method called FSR (Fisheye State Routing protocol) that controls the transmission frequency in accordance with the distance (hop count) from the communication terminal is disclosed in the following Non-Patent Document 3. However, correct topology information cannot be obtained in this method and, after all, it is difficult to perform stable communication in a network a movement of a node happens frequently.

Non-Patent Document 1: T. Clause and other one, "Optimized Link State Routing Protocol (OLSR)", IETF RFC3626, October 2003

Non-Patent Document 2: R. Ogier and other two, "Topology Dissemination Based on Reverse-Path Forwarding (TBRPF)", IETF RFC3684, February 2004

Non-Patent Document 3: A. Iwata and other four, "Scalable Routing Strategies for Ad-hoc Wireless Networks", IEEE JSAC, August 1999, Vol. 17, No. 8, p. 1369-1379

Non-Patent Document 4: Zygmunt Haas and other two, "Gossip-based ad hoc routing", IEEE INFOCOM 2002, 2002

DISCLOSURE OF INVENTION

In the conventional communication route control method for the Proactive type wireless multi-hop network, a large amount of messages to be transmitted makes it difficult to apply this method to a network exhibiting lower bandwidth capability. In the network constituted by communication terminals having different movement speed, the transmission frequency needs to be adjusted to a communication terminal exhibiting the highest movement speed, consuming unnecessary bandwidth. Further, frequent message transmission increases the power consumption of the terminal. Moreover, in the case where a given communication terminal moves at a higher speed than expected, normal route control cannot be performed and therefore communication may break down.

An object of the present invention is to provide the above problems and to provide a communication route control method for a wireless multi-hop network system and a communication terminal that realize stable communication in accordance with a movement characteristic with a small message transmission frequency.

To attain the above object, according to the present invention, there is provided a communication route control method for a wireless multi-hop network system which forms a wireless multi-hop network in which control packets are exchanged by wireless signals between a plurality of communication terminals serving as nodes of the network, retains topology information of the wireless multi-hop network, and controls communication routes of the packets exchanged between the communication terminals based on the topology information, characterized by comprising: a step in which each of the communication terminals detects its own movement information including at least a movement speed; a step in which each of the communication terminals controls the exchange frequency of the control packet to be exchanged with other communication terminals on the wireless multi-hop network based on the detected movement information so as to reduce a control load in accordance with its movement state; and a step in which each of the communication terminals updates the topology information of the wireless multi-hop network that each itself retains based on the control packets from the other communication terminals.

In the present invention, the communication route control method for a wireless multi-hop network system may further comprise: a step in which each of the communication terminals receives instruction information from a user; and a step in which each of the communication terminals controls the exchange frequency of the control packet according to the instruction information.

In the present invention, the communication route control method for a wireless multi-hop network system may further comprise: a step in which each of the communication terminals receives instruction information from a network management apparatus on the wireless multi-hop network; and a step in which each of the communication terminals controls the exchange frequency of the control packet according to the instruction information.

In the present invention, the communication route control method for a wireless multi-hop network system may further comprise: a step in which each of the communication terminals detects its own communication state including the transmission frequency of data packet; and a step in which each of the communication terminals controls the exchange frequency of the control packet according to the communication state such that the higher the transmission frequency of the data packet, the lower the exchange frequency of the control packet becomes.

In the present invention, the communication route control method for a wireless multi-hop network system may further comprise: a step in which each of the communication terminals exchanges neighbor detection messages with neighboring communication terminals on the wireless multi-hop network as the control packets; a step in which, when a link with each of the neighboring communication terminals has been established by the exchange of the neighbor detection message, each of the communication terminals retains, in addition to terminal identification information of each of the neighboring communication terminals, identification attribute information of the neighbor detection message received from each of the neighboring communication terminals at the time point when the link has been established as link information included in the topology message; and a step in which each of the communication terminals broadcasts, as the control packet, a network topology message including the link information composed of the terminal identification information of each of the neighboring communication terminals and identification attribute information of the neighbor detection message on the wireless multi-hop network.

In the present invention, the communication route control method for a wireless multi-hop network system may further comprise: a step in which, when receiving the network topology message including the link information from each of the other communication terminals, each of the communication terminals compares the identification attribute information of the neighbor detection message included in the link information of the network topology message and identification attribute information of the neighbor detection message included in the link information that each of the communication terminals itself retains for each neighboring communication terminal; and a step in which, in the case where the identification attribute information of the neighbor detection message included in the link information of the network topology message is newer than the identification attribute information of the neighbor detection message included in the link information that each of the communication terminals itself retains, each of the communication terminals updates the link information that each itself retains.

In the present invention, the communication route control method for a wireless multi-hop network system may further comprise: a step in which, when broadcasting the network topology message, each of the communication terminals selects a broadcast method of the network topology message in accordance with a state of the neighboring communication terminal that causes the link information included in the topology information to be changed.

In the present invention, the communication route control method for a wireless multi-hop network system may further comprise: a step in which, when receiving a topology message having a newer link information than the link information that each of the communication terminals itself retains, each of the communication terminals transmits a neighbor detection message transmission request to a neighboring communication terminal corresponding to the link information and confirms a connection with the neighboring communication terminal depending on presence/absence of a reply from the neighboring communication terminal.

Further, according to the present invention, there is provided a communication terminal for use in a wireless multi-hop network system which forms a wireless multi-hop network in which control packets are exchanged by wireless signals between a plurality of communication terminals serving as nodes of the network, retains topology information of the wireless multi-hop network, and controls communication routes of the packets exchanged between the communication terminals based on the topology information, characterized by comprising: a means for detecting own movement information including at least a movement speed; a means for controlling the exchange frequency of the control packet to be exchanged with other communication terminals on the wireless multi-hop network based on the detected movement information so as to reduce a control load in accordance with its movement state; and a means for updating the topology information of the wireless multi-hop network that the communication terminal itself retains based on the control packets from the other communication terminals.

Further, according to the present invention, there is provided a wireless multi-hop network which includes a plurality of communication terminals, forms a wireless multi-hop network in which control packets are exchanged by wireless signals between the communication terminals serving as nodes of the network, retains topology information of the wireless multi-hop network, and controls communication routes of the packets exchanged between the communication terminals based on the topology information, characterized in that each of the communication terminals comprises: a means for detecting own movement information including at least a movement speed; a means for controlling the exchange frequency of the control packet to be exchanged with other communication terminals on the wireless multi-hop network based on the detected movement information so as to reduce a control load in accordance with its movement state; and a means for updating the topology information of the wireless multi-hop network that the communication terminal itself retains based on the control packets from the other communication terminals.

Further, according to the present invention, there is provided an operation program of a communication terminal for use in a wireless multi-hop network system which forms a wireless multi-hop network in which control packets are exchanged by wireless signals between a plurality of communication terminals serving as nodes of the network, retains topology information of the wireless multi-hop network, and controls communication routes of the packets exchanged between the communication terminals based on the topology information, characterized by allowing a computer to execute the steps of: detecting movement information of each of the communication terminals itself, including at least a movement speed; controlling the exchange frequency of the control packet to be exchanged with other communication terminals on the wireless multi-hop network based on the detected movement information so as to reduce a control load in accordance with the movement state of each of the communication terminals itself; and updating the topology information of the wireless multi-hop network that each of the communication terminals itself retains based on the control packets from the other communication terminals.

According to the present invention, it is possible to suppress the transmission frequency of a message (control packet) required for route control when each of communication terminals is not in a movement state to reduce a message load involving the route control, thereby suppressing power consumption of each of the communication terminals. Further, establishment of communication routes can be speeded up at the time of movement state of the communication terminals, thereby realizing more stable communication. As described above, it is possible to realize stable communication in accordance with a movement characteristic with a small message transmission frequency.

BRIEF DESCRIPTION OF DRAWINGS

FIG. 3 is a view showing an example of a HELLO message transmitted/received by the communication terminal shown in FIG. 1;

FIG. 4 is a view showing an example of a topology message transmitted/received by the communication terminal shown in FIG. 1;

FIG. 8 is a view for explaining a neighboring node table of the node 45 updated at the time point when a link between the nodes 41 and 45 shown in FIGS. 5 and 6 has been established;

FIG. 9 is a view for explaining a topology table of the node 45 updated at the time point when a link between the nodes 41 and 45 shown in FIGS. 5 and 6 has been established;

FIG. 10 is a view for explaining the neighboring node table of the node 45 updated at the time point when the node 41 shown in FIGS. 5 and 6 has moved outside the coverage area of the node 45;

FIG. 11 is a view for explaining the neighboring node table of the node 45 updated after the node 41 shown in FIGS. 5 and 6 has moved;

FIG. 12 is a view for explaining link information of the topology message that the node 45 broadcasts before the node 41 shown in FIGS. 5 and 6 starts moving;

FIG. 13 is a view for explaining link information of the topology message that the node 42 broadcasts after the node 41 shown in FIGS. 5 and 6 has started moving;

FIG. 14 is a view for explaining link information of the topology message that the node 45 broadcasts after the node 41 shown in FIGS. 5 and 6 has started moving;

EXPLANATION OF REFERENCE SYMBOLS

1: Wireless multi-hop network
11 to 14: Communication terminal (node)
21: Wireless communication unit
22: Route control section
23: Neighboring node table
24: Topology table
25: Movement detection unit

BEST MODE FOR CARRYING OUT THE INVENTION

Preferred embodiments of a communication route control method for a wireless multi-hop network system and a communication terminal according to the present invention will be described with reference to the accompanying drawings.

First Embodiment

A wireless multi-hop network system (mobile ad-hoc network) system according to the present embodiment is a system to which the abovementioned Proactive type protocol (OLSR protocol: Optimized Link State Routing Protocol) of Non-Patent Document 1 has been applied.

Typically, in the wireless multi-hop network, a technique called "Flooding" is adopted. In the flooding technique, packets constituting the same message are broadcasted from one node (communication terminal) to all nodes. In this case, if all the nodes forward (retransmit) the message, the message are naturally broadcasted to all the nodes. If so, however, the number of messages to be retransmitted becomes too large, deteriorating data communication efficiency. In order to cope with this problem, the above Non-Patent Document 1 employs the following mechanism so as to perform flooding effectively.

First, one source node calculates a set of neighboring nodes covering all nodes within two hops of the source node. Then, the source node selects the calculated neighboring node set as "MPR (Multi-Point-Relay)", and only the neighboring nodes (MPR nodes) selected as MPR forward the message from the source node. The wireless multi-hop network system of the present embodiment is built based on the flooding technique using the MPR nodes.

Figure 1:
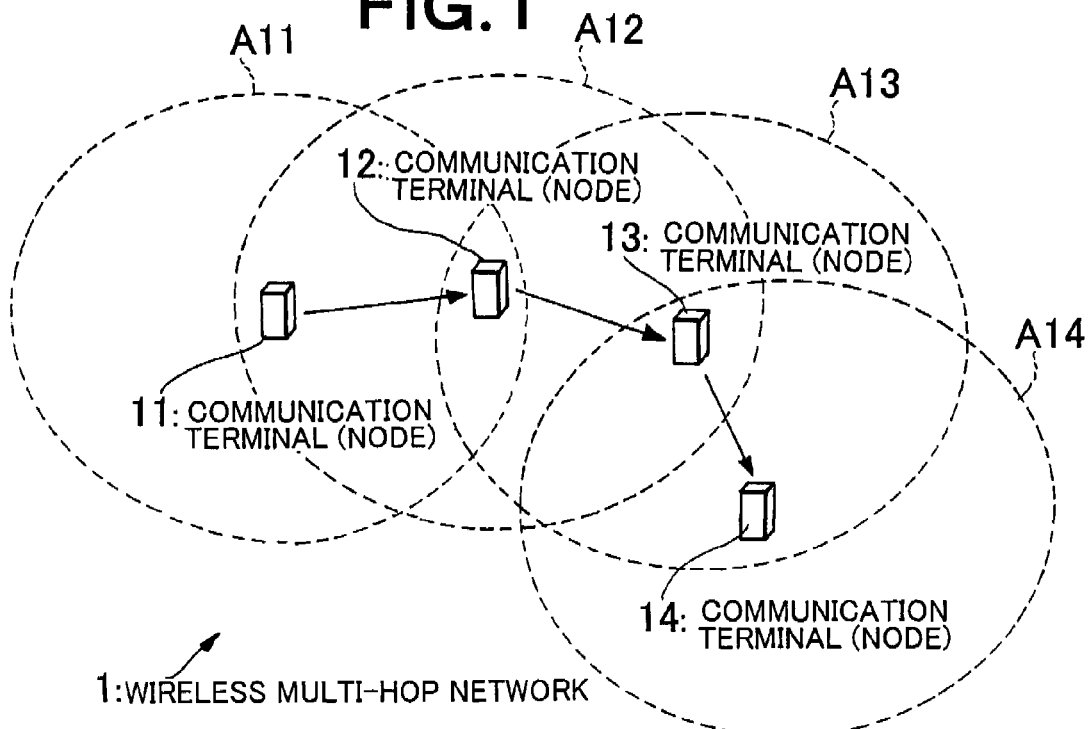
FIG. 1 is a view showing the entire configuration of a wireless multi-hop network system according to a first embodiment of the present invention.

FIG. 1 shows an example of a network configuration in the wireless multi-hop network system according to the present embodiment.

In FIG. 1, the wireless multi-hop network system includes a plurality of communication terminals 11 to 14. The communication terminals 11 to 14 each act as a node on the wireless network and exchange a control packet between respective nodes by wireless signals in an autonomous manner. As described above, a wireless multi-hop network 1 is built as a wireless network constituted by the respective nodes. Each of the communication terminals 11 to 14 acting as the nodes on the wireless multi-hop network 1 may be a handheld terminal such as a mobile phone or a radio apparatus installed in a mobile object such as a car, airplane, or ship.

In the wireless multi-hop network 1, each of the communication terminals 11 to 14 acting as a node directly communicates with given communication terminals located within the area (coverage area) that its own radio signal can reach (A11 to A14 in FIG. 1 denote coverage areas of the communication terminals 11 to 14, respectively). Further, each of the communication terminals 11 to 14 forwards packets through other communication terminals. Thus, packets are transmitted from a source communication terminal (source node) to a destination communication terminal (destination node). In the example of FIG. 1, packets are transmitted from the source communication terminal 11 to destination communication terminal 14 through the communication terminals 12 and 13 (arrows in FIG. 1 denote the packet forwarding direction). The communication terminals 11 to 14 each have a unique node ID (Identification Data) and IP (Internet Protocol) address as terminal identification information used for transmission/reception and flooding of packets on the wireless multi-hop network 1.

Figure 2:
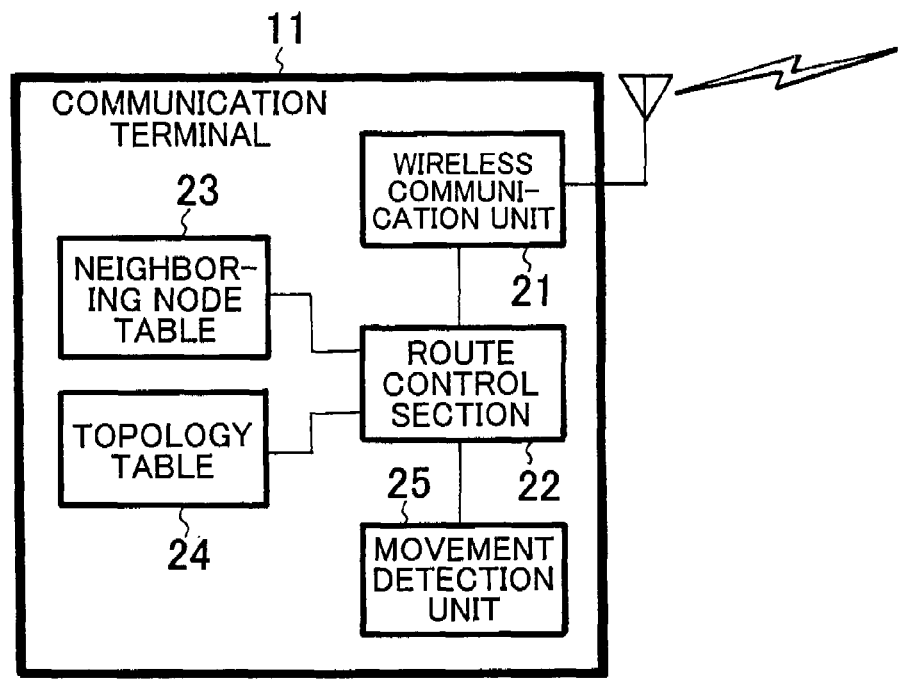
FIG. 2 is a block diagram schematically showing an internal configuration of a communication terminal shown in FIG. 1.

FIG. 2 shows an internal configuration of the communication terminal 11. Other thermals 12 to 14 have the same configuration as that of the communication terminal 11, and descriptions thereof are omitted.

The communication terminal 11 functionally includes a wireless communication unit 21 having an antenna, a route control section 22 connected to the wireless communication unit 21, a neighboring node table 23 connected to the route control section 22, a topology table 24, and a movement detection unit 25. The wireless communication unit 21 communicates with other communication terminals 12 to 14 by wireless signals using an antenna. The route control section 22 serves as a control center for executing operations corresponding to respective means and steps of the present invention. The neighboring node table 23 manages information concerning neighboring communication terminals (neighboring nodes). The topology table 24 manages network topology information. The movement detection unit 25 measures information concerning a movement state of the communication terminal 11 such as a movement speed.

In this configuration, the communication terminal 11 exchanges, through the wireless communication unit 21, a route control message (control packets) such as a neighbor detection message (hereinafter, referred to as "HELLO message") and a topology message based on a previously set packet format. Then, the communication terminal 11 updates the neighboring node table 23 and topology table 24 based on the information in these messages.

To the neighboring node table 23 and topology table 24, the node ID of a neighboring node, as well as, information such as the sequence number (HELLO sequence number) of the latest HELLO message received from the neighboring node are written in a rewritable manner.

The role of the HELLO message is to detect neighboring nodes and to establish a link therebetween. The role of the topology message is to grasp the topology (link information) of the entire network. In the present embodiment, the topology massage is flooded to all the nodes on the network. On the other hand, the HELLO message is received only by a communication terminal (neighboring node) within one hop of a source communication terminal, and is not forwarded to a next-hop node.

With reference to FIGS. 3 and 4, configuration examples of the HELLO message and topology message will be described.

First, with reference to FIG. 3, a configuration (packet format) example of the HELLO message will be described.

As shown in FIG. 3, the HELLO message includes the following fields: "message type", "effective period", "message size", "transmission node ID", "TTL (Time To Live)", "hop count", "sequence number", "flag", "broadcast interval", "WILLINGNESS", "DB (database) signature", and "neighboring node information".

"Message type" represents the type of a message. "Effective period" represents the time period during which a message is managed. "Message size" represents the length of a message. "Transmission node ID" represents the node ID of a source communication terminal. "TTL" represents the maximum hop count of a message to be forwarded. Every time a message is forwarded, the TTL of the message is reduced by one. "Hop count" represents the hop count from a source communication terminal of a message. Initially, the hop count is set to 0 and increased by one every time the message is forwarded. "Sequence number" represents an identification number (identification attribute information) assigned for uniquely identifying each message and is increased by one every time a message is created. "Broadcast interval" represents the time interval at which a message is broadcasted. "WILLINGNESS" represents the willingness for a neighboring node to perform retransmission and has values from 0 to 7. The neighboring node is selected as the MPR more often as the value of "WILLINGNESS" becomes large. "Neighboring node information" represents information (node ID, etc.) concerning the neighboring node with which a link has been established.

The HELLO message according to the present invention differs from that disclosed in the above Non-Patent Document 1 in that two fields of "flag" and "DB signature" to be described below are newly added.

That is, in the "flag" field, a flag indicating whether a given communication terminal itself is in a movement state (hereinafter, referred to as "movement flag") and a flag indicating whether a given communication terminal itself had been selected as the abovementioned MPR before it was moved are set.

In the "DB signature" field, a signature (numerical value) calculated using a predetermined calculation expression such as a hash function based on the content of the topology table 24 of a given communication terminal itself is set. Accordingly, the value of the DB signature exhibits one-to-one correspondence with the content of the topology table 24. For example, in the case where the values of the DB signature are the same between one node and another, it can be understood that the contents of the topology tables 24 that the both nodes retain are the same. On the other hand, in the case where the values of the DB signature differ between one node and another, it can be understood that the contents of the topology tables 24 that the both nodes retain differ from each other. Thus, by comparing the values of the DB signatures with a neighboring node, it is possible to determine whether the content of the topology table 24 of a given communication terminal itself and contents of the topology table 24 of a neighboring node correspond to each other. If the contents do not correspond to each other, a DB sync request is transmitted to the neighboring node for DB sync processing.

Next, with reference to FIG. 4, a configuration example of the topology message will be described.

As shown in FIG. 4, the topology message includes the following fields: "message type", "effective period", "message size", "transmission node ID", "TTL", "hop count", "sequence number", "topology sequence number", "flag", and "link information".

"Message type" represents the type of a message. "Effective period" represents the time period during which a message is managed. "Message size" represents the length of a message. "Transmission node ID" represents the node ID of a source communication terminal. "TTL" represents the maximum hop count of a message to be forwarded. Every time a message is forwarded, the TTL of the message is reduced by one. "Hop count" represents the hop count from a source communication terminal of a message. Initially, the hop count is set to 0 and increased by one every time the message is forwarded. "Sequence number" represents an identification number (identification attribute information) assigned for uniquely identifying each message and is increased by one every time a message is created.

The topology message according to the present invention differs from that disclosed in the above Non-Patent Document 1 in that the "flag" field is newly added and that HELLO sequence number is included in the "link information".

That is, in the "flag" field, a flag indicating a flooding method for broadcasting the topology message throughout the wireless multi-hop network 1 is set. This flag includes an alternate flooding flag. This flooding flag is set when a neighboring node selected as the MPR moves to prevent message flooding using the MPR from being normally performed. In other words, in the case where the alternate flooding flag has not been set, flooding according to the MPR is performed as usual. On the other hand, in the case where the alternate flooding flag has been set, it is determined that the flooding according to the MPR cannot be performed normally, and flooding according to an alternate method is performed. For example, a method disclosed in Non-Patent Document 4 is used as the alternate flooding method.

In the "link information" field, a link ID indicating the node ID of a neighboring node with which a link has been established, as well as, a HELLO sequence number are included as link information. In this HELLO sequence number, the sequence number of a HELLO message received from a neighboring node with which a link has been established is set at the time point of the establishment of the like.

The route control section 22 exchanges a route control message such as the HELLO message and topology message by wireless signals through the wireless communication unit 21 and stores information in the received message in the neighboring node table 23 and topology table 24.

The route control section 22 performs the following operations.

1) When receiving a HELLO message from the other communication terminals 12 to 14 which are moving, the route control section 22 controls the transmission interval of a HELLO message of the communication terminal 11 itself in accordance with the received messages.

2) When establishing a link with the neighboring communication terminals 12 to 14 newly, the route control section 22 includes established link information (node ID) and sequence numbers of the latest HELLO messages received at that time from the other communication terminals 12 to 14 in the link information (link ID, HELLO sequence number) in the "link information" field in the topology message and broadcasts the topology message.

3) When receiving new topology messages from the other communication terminals 12 to 14, the route control section 22 updates information (node ID, HELLO sequence number) of the topology table 24 of the communication terminal 11 itself based on the link information (link ID, HELLO sequence number) in the "link information" field in the topology messages.

4) The route control section 22 compares information (node ID, HELLO sequence number) of the neighboring node table 23 and link information (link ID, HELLO sequence number) of the topology message. Then, if the information in the neighboring node table 23 of the communication terminal 11 itself is older than the link information in the topology message in the case where the node IDs of the both information are the same and HELLO sequence numbers thereof differ from each other, that is, the HELLO sequence number of the neighboring node table 23 of the communication terminal 11 itself is older than that of the topology message, the route control section 22 deletes the information in the neighboring node table 23 of the communication terminal 11 itself.

5) The route control section 22 controls the transmission interval of the route control message (HELLO message and topology message, etc.) based on movement information notified from the movement detection unit 25 such as movement speed information of the communication terminal 11 itself.

The movement detection unit 25 constantly measures a movement state such as movement speed information of a communication terminal and notifies the route control section 22 of the measured movement state. The movement detection unit 25 is constituted by a measurement instrument such as a known GPS (Global Positioning System) receiver, an acceleration sensor, or speed sensor, and any other types of measurement instruments may be used as long as it can measure a movement state such as the movement speed of the communication terminal 11 itself. In the case where the communication terminal 11 is a vehicle-mounted apparatus, it may receive a vehicle speed signal from a vehicle speed sensor installed in a car, etc.

Operation of the present embodiment will next be described.

When being activated, each of the communication terminals 11 to 14 periodically transmits the HELLO message. Then, each of the other communication terminals 11 to 14 (hereinafter, referred to as "neighboring nodes", if needed) located within the areas A11 to A14 that radio signals of the communication terminals 11 to 14 can reach receives the HELLO message from the communication terminal 11 to become aware of the existence of the communication terminal 11.

Subsequently, upon reception of the HELLO messages, each of the communication terminals 11 to 14 writes neighboring node information (node ID, etc) in the neighboring node table 23 based on the received HELLO message. The operation described up to here is the same as those in the methods of the abovementioned Non-Patent Documents 1 and 2. However, the operation according to the present embodiment differs from those in the methods of the abovementioned Non-Patent Documents 1 and 2 in the point that the sequence number of the HELLO message (HELLO sequence number) is also written in the neighboring node table 23. The information of the HELLO sequence number written here is updated every time a new HELLO message is received.

Subsequently, when a neighboring node is detected, each of the communication terminals 11 to 14 selects an MPR node, creates a topology message, and broadcasts the created topology message. This operation is also the same as that in the method of the abovementioned Non-Patent Document 1. However, the operation according to the present embodiment differs from that in the method of the abovementioned Non-Patent Document 1 in the point that, in the "link information" field in the topology message, not only the link ID indicating the node ID of the detected neighboring node but also the sequence number of the HELLO message (HELLO sequence number) based on which the link information has been created are included.

Subsequently, upon reception of the topology messages, each of the communication terminals 11 to 14 writes link information (node ID, HELLO sequence number) in the topology table 24 based on a link ID and a HELLO sequence number in the "link information" field in the topology message. Also in this case, the operation according to the present embodiment differs from that in the method of the abovementioned Non-Patent Document 1 in the point that the HELLO sequence number is written in the topology table 24.

In the case where a given time has elapsed since each of the communication terminals 11 to 14 was activated and where each of them has not moved, the transmission interval of the HELLO message and topology message is made larger little by little up to a set maximum value. Thus, occurrence of a message can be suppressed between the communication terminals 11 to 14 in the case where they have not moved.

When the communication terminals 11 to 14 start moving, their communication detection units 25 detect the movements and notify their route control sections 22 of the detected movements. Then, the route control sections 22 each select an adequate transmission interval of the HELLO message in accordance with the detected movement speed and transmit the HELLO message at the selected transmission interval. At this time, a movement flag is set in the "flag" field in the HELLO message to thereby notify the neighboring nodes that respective communication terminals are moving. Further, in the case where the respective communication terminals are each selected as the MPR node of the flooding by any of the neighboring nodes, an MPR selection flag is set in the "flag" field in the HELLO message.

Subsequently, upon reception of the HELLO message from each of the communication terminals 11 to 14 which are moving (hereinafter, referred to as "movement nodes", if needed), each of the neighboring nodes transmits the HELLO message with its HELLO message transmission interval adjusted to the transmission intervals of the movement nodes. When establishing a link with the movement node newly, each of the neighboring nodes updates the information in the neighboring node table 23 and link information (node ID, HELLO sequence number) in its own topology table 24. The link information is then included in the link information (link ID, HELLO sequence number) of the "link information" field in the topology message and is broadcasted.

At this time, the sequence number (HELLO sequence number) of the latest HELLO message exchanged for establishing a link with the movement node is included. Further, in the case where the MPR selection flag has been set in the "flag" field in the HELLO message of the movement node, there is a possibility that the flooding according to the MPR cannot normally be performed. Therefore, the alternate flooding flag is set in the "flag" field in the topology message for the broadcast. The topology message broadcasted by the neighboring node is broadcasted throughout the wireless multi-hop network 1 by flooding.

Subsequently, upon reception of the topology message, each of the communication terminals 11 to 14 checks whether the alternate flooding flag has been set in the "flag" field in the topology message. Then, in the case where the alternate folding flag has not been set, each of the communication terminals 11 to 14 performs the flooding according to the MPR as usual. In the case where the alternate flooding flag has been set, each of the communication terminal 11 to 14 determines that the flooding according to the MPR cannot normally be performed and performs the flooding according to an alternate method. For example, a method disclosed in Non-Patent Document 4 is used as the alternate flooding method.

As described above, the topology message broadcasted by each of the neighboring nodes is broadcasted throughout the wireless multi-hop network 1 by flooding.

Subsequently, upon reception of the topology message, each of the communication terminals 11 to 14 compares the link information (link ID, HELLO sequence number) in the topology message and link information (node ID, HELLO sequence number) of its own topology table 24. Then, in the case where the link information in the topology message is newer, each of the communication terminals 11 to 14 updates the information in the topology table 24.

Further, each of the communication terminals 11 to 14 compares the link information in the topology message and information in its own neighboring node table 23 to thereby compare the HELLO sequence number with that of the link information having the same node ID as its own neighboring node. Then, if the HELLO sequence number in its own neighboring node table 23 is older than that of the link information in the topology message, each of the communication terminals 11 to 14 performs the following processing. That is, each of the communication terminals 11 to 14 determines that the neighboring node moves outside its own coverage area and deletes the information of the neighboring node from the neighboring node table 23. Further, each of the communication terminals 11 to 14 updates the link information in the topology table 24 and includes the updated link information in the "link information" field in the topology message so as to broadcast it throughout the wireless multi-hop network 1.

Next, with reference to FIGS. 5 to 14, a concrete example of the above operation will be described.

FIGS. 5 to 14 explains the operation in the case where a node 41 moves in a wireless multi-hop network constituted by five nodes (communication terminals) 41 to 45. In FIGS. 5 to 14, Hello (number) denotes a HELLO message and its sequence number, and topology Msg denotes a topology message.

Figure 5:
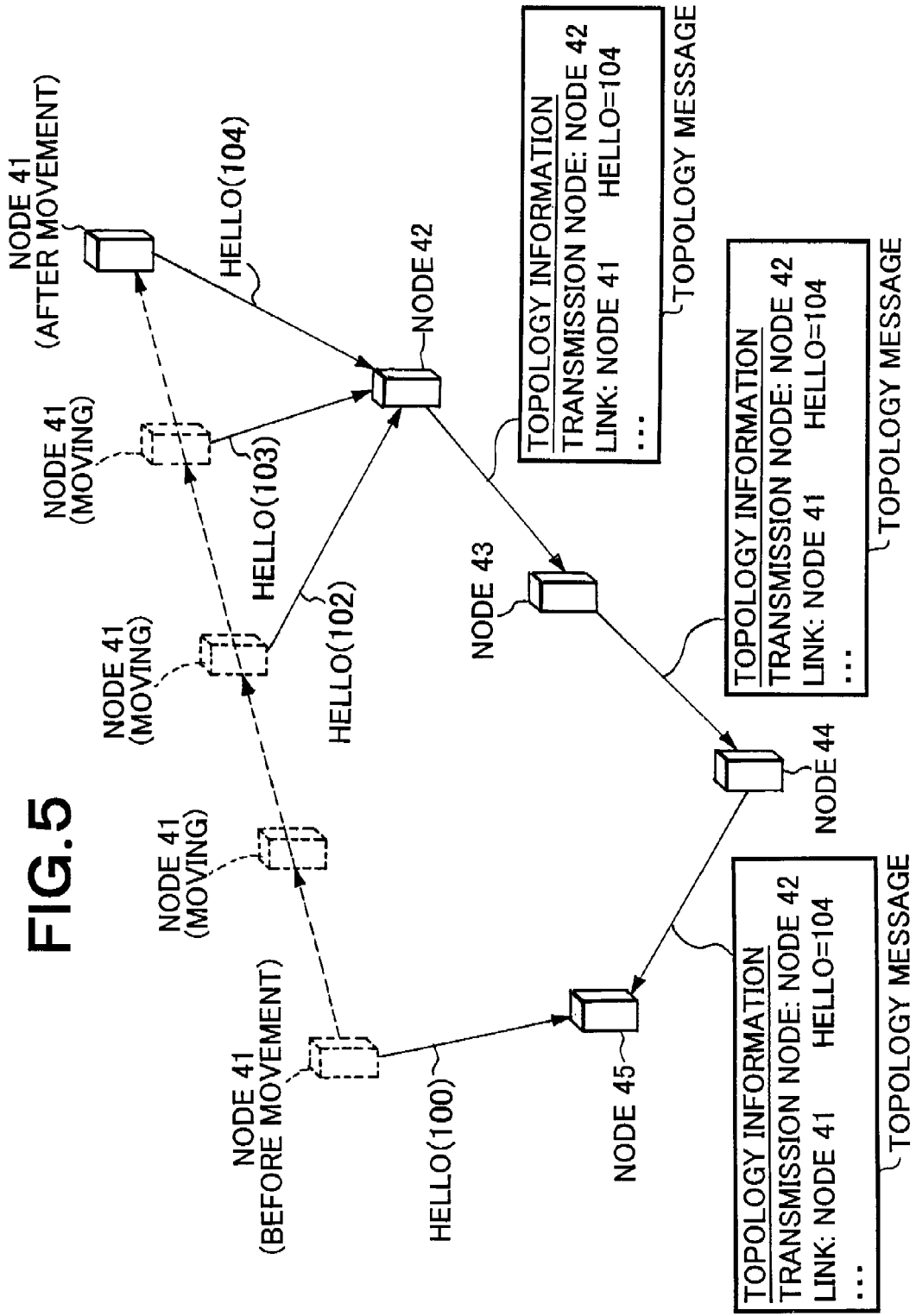
FIG. 5 is a view schematically showing the outline of operation of the wireless multi-hop network shown in FIG. 1 using five nodes 41 to 45.
Figure 6:
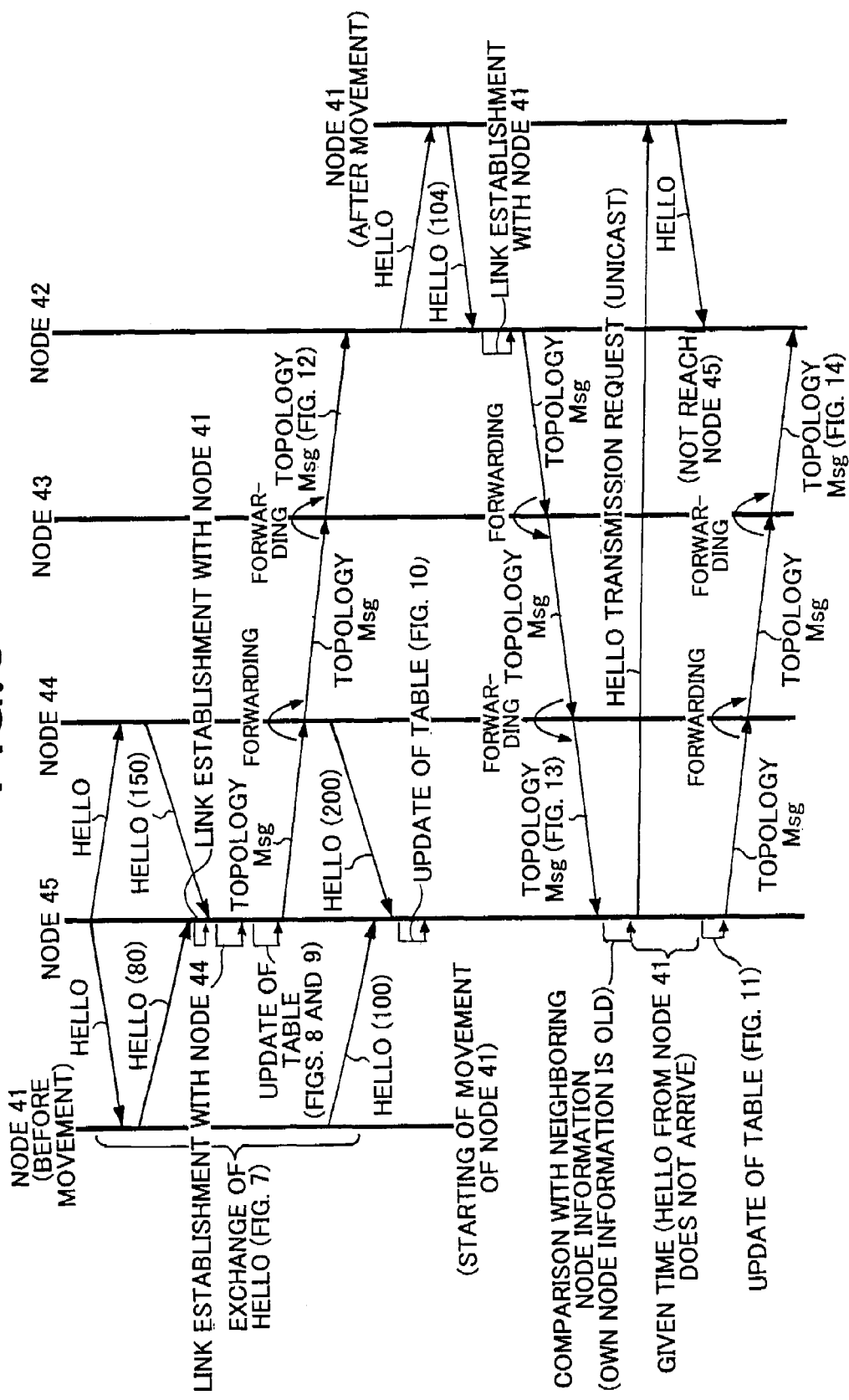
FIG. 6 is a sequence diagram for explaining operation of the wireless multi-hop network shown in FIG. 5.

In FIG. 5, the node 45 exchanges HELLO messages with the nodes 41 and 44, respectively to establish neighbor relations therewith before the node 41 starts moving (see FIG. 6). Here, the sequence number of a HELLO message that the node 45 receives from the node 41 at the time point when a link therebetween has been established is assumed to be 80, and sequence number of a HELLO message that the node 45 receives from the node 44 at the time point when a link therebetween has been established is assumed to be 150. In this case, as shown in FIG. 8, two neighboring node information (node ID, HELLO sequence number), that is, (node 41, 80) and (node 44, 150) are written in the neighboring node table 23 of the node 45. Similarly, as shown in FIG. 9, two link information (node ID, HELLO sequence number), that is, (node 41, 80) and (node 44, 150) are written in the topology table 24 of the node 45.

In this case, the node 45 broadcasts a topology message including two link information (link ID, HELLO sequence number) shown in FIG. 12, that is, (node 41, 80) and (node 44, 150) throughout the wireless multi-hop network. At this time, the HELLO sequence number to be included in the link information (link ID, HELLO sequence number) in the topology message is a sequence number of the HELLO message obtained at the time point when a link with the relevant node has been established. This topology message is, as shown in FIG. 6, sequentially forwarded to the node 44, node 43, and node 42 by flooding.

Subsequently, the HELLO messages are exchanged between the nodes 41 and 45. The sequence number of the HELLO message is increased one by one for each exchange. Along with the increase in the sequence number, the neighboring node information (node ID, HELLO sequence number) of the neighboring node table 23 and link information (link ID, HELLO sequence number) of the topology table 24 are updated.

Figure 7:
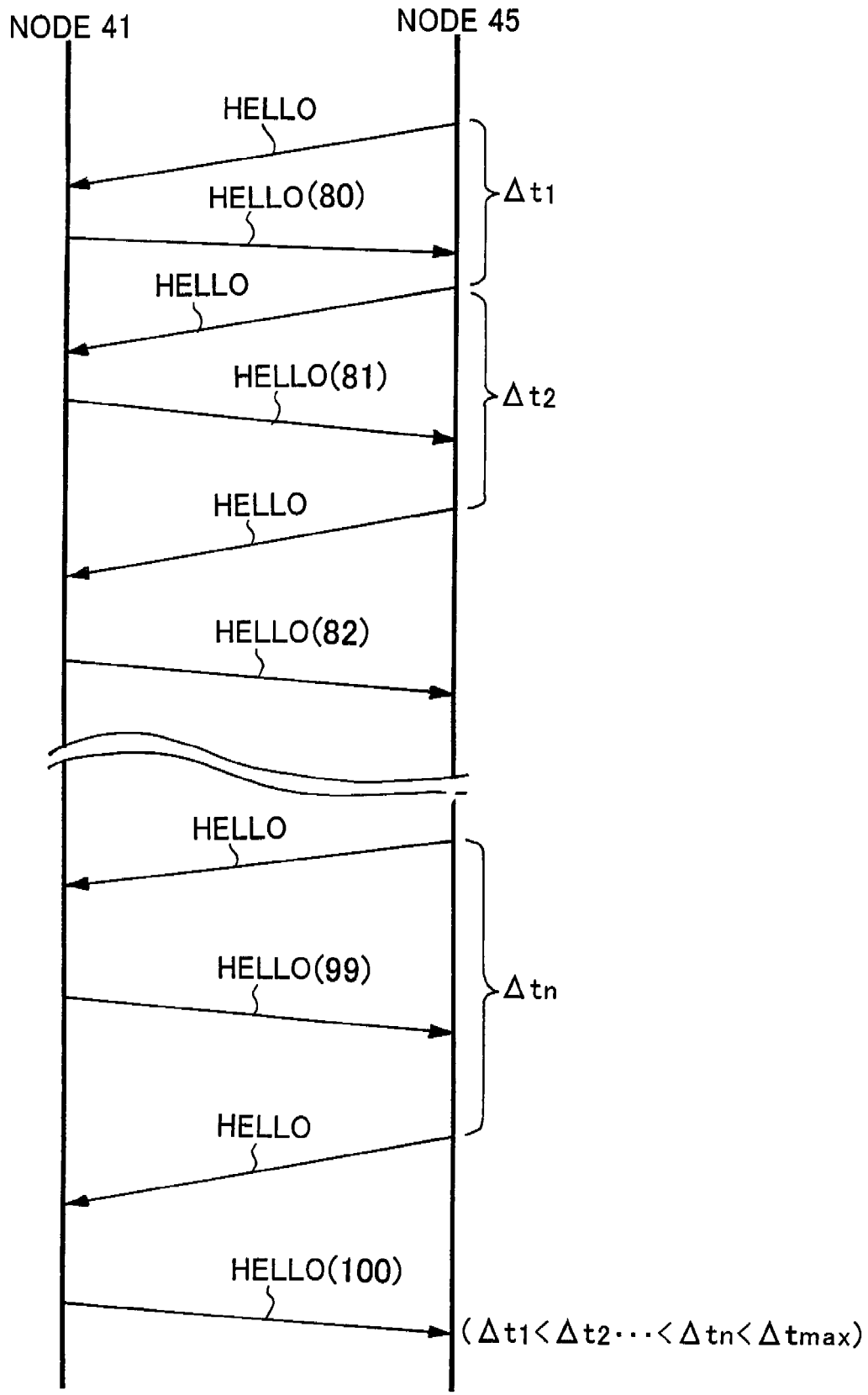
FIG. 7 is a view for explaining a state where the HELLO messages are exchanged between nodes 41 and 45 shown in FIGS. 5 and 6 before they start moving.

Since the nodes 41 and 45 do not move at that time, the transmission interval of the HELLO message between them has become larger. That is, the transmission interval is made larger little by little up to a set maximum value. FIG. 7 shows a state where the HELLO messages are exchanged between nodes 41 and 45. As shown in FIG. 7, the transmission interval of the HELLO message from the node 45 to node 41 is controlled to be gradually extended from Δt1 to Δt2, and to Δtn, up to the maximum value Δtmax. The same is true for the transmission interval of the HELLO message from the node 41 to node 45. The above control suppresses the number of messages exchanged between the nodes 41 and 45 which are not in a movement state. The same is true for not shown message exchange between the nodes 45 and 44.

The above exchange of the HELLO messages between the nodes 45 and 41 is continued until the node 41 moves outside the coverage area of the node 45. It is assumed, at this time, that the sequence number of the latest HELLO message transmitted from the node 41 to node 45 is 100 and sequence number of the latest HELLO message transmitted from the node 44 to node 45 is 200. In this case, two neighboring node information (node ID, HELLO sequence number) shown in FIG. 10, that is, (node 41, 100) and (node 44, 200) are written in the neighboring node table 23 of the node 45.

It is assumed, as shown in FIG. 5, that the node 41 starts moving and then goes off the coverage area of the node 45 (see dotted arrows in FIG. 5). At this time, the node 41 which is a moving node extends the transmission interval of the HELLO message in accordance with the movement speed detected by its own movement detection unit 25. Then, the node 41 sets a movement flag in the "flag" field in the HELLO message and transmits this HELLO message.

Upon reception of the HELLO message of the node 41, the node 42 confirms the movement flag in the "flag" filed in the HELLO message and adjusts its own HELLO message transmission interval to the HELLO message transmission interval of the node 41.

Subsequently, link establishment is performed between the nodes 41 and 42. Here, the sequence number of the latest HELLO message that the node 42 receives from the node 41 at the time point when a link therebetween has been established is assumed to be 104, and sequence number of the latest HELLO message that the node 42 receives from the node 43 at the time point when a link therebetween has been established is assumed to be 300 (see FIG. 6). In this case, as shown in FIG. 13, the node 42 creates a topology message including two link information (link ID, HELLO sequence number), that is, (node 41, 104) and (node 43, 300) and broadcasts the created topology message. As described above, the topology message transmitted from the node 42 (transmission node) is sequentially forwarded to the node 43, node 44, and finally broadcasted to the node 45 (see FIGS. 5 and 6).

Upon reception of the topology message that has been transmitted from the node 42 (transmission node) and forwarded through the nodes 43 and 44, the node 45 compares the link information (node 41, 104) in the topology message and neighboring node information (node 41, 100) (FIG. 10) in its own neighboring node table 23. Then, if the HELLO sequence number in its own neighboring node table 23 is older than that of the link information in the topology message, the node 45 deletes the neighboring node information (node 41, 100) in the neighboring node table 23.

At this time, the node 45 can selectively perform confirmation of the existence of the node 41, before the delete of the neighboring node information of the node 41 from the neighboring node table 23, by transmitting a HELLO message transmission request to the node 41 by unicast. Here, a communication terminal acting as a node must transmit a HELLO message within a given time period when it has received a HELLO message transmission request for itself. Thus, if the node 45 has not received the HELLO message from the node 41 within a given time period, the node 45 determines that the node 41 has moved outside the coverage area of the node 45 and deletes the neighboring node information in the neighboring node table 23. Consequently, as shown in FIG. 11, the neighboring node information (node 41, 100) concerning the node 41 is deleted, and only the neighboring node information (node 44, 200) concerning the node 44 remains in the neighboring node table 23 of the node 45.

Then, in order to cancel the link information (node 41, 80) that is being broadcasted, the node 45 then broadcasts a new topology message including one link information (link ID, HELLO sequence number) shown in FIG. 14, that is, (node 44, 200) throughout the wireless multi-hop network (see FIG. 6). Then, all the nodes in the wireless multi-hop network acquire the latest link information by the topology message broadcasted by the node 45 (transmission node) as described above and perform recalculation of the route to thereby maintain their communication route.

Next, with reference to FIGS. 15 to 18, a concrete example of transmission/reception processing of the HELLO message and topology message will be described. A control program shown in respective flowcharts of FIGS. 15 to 18 is previously stored in a not shown memory (ROM, etc.) in the route control section 22 of each of the communication terminals 11 to 14 and read out by a not shown processor (CPU) in the route control section 22 for execution.

Figure 15:
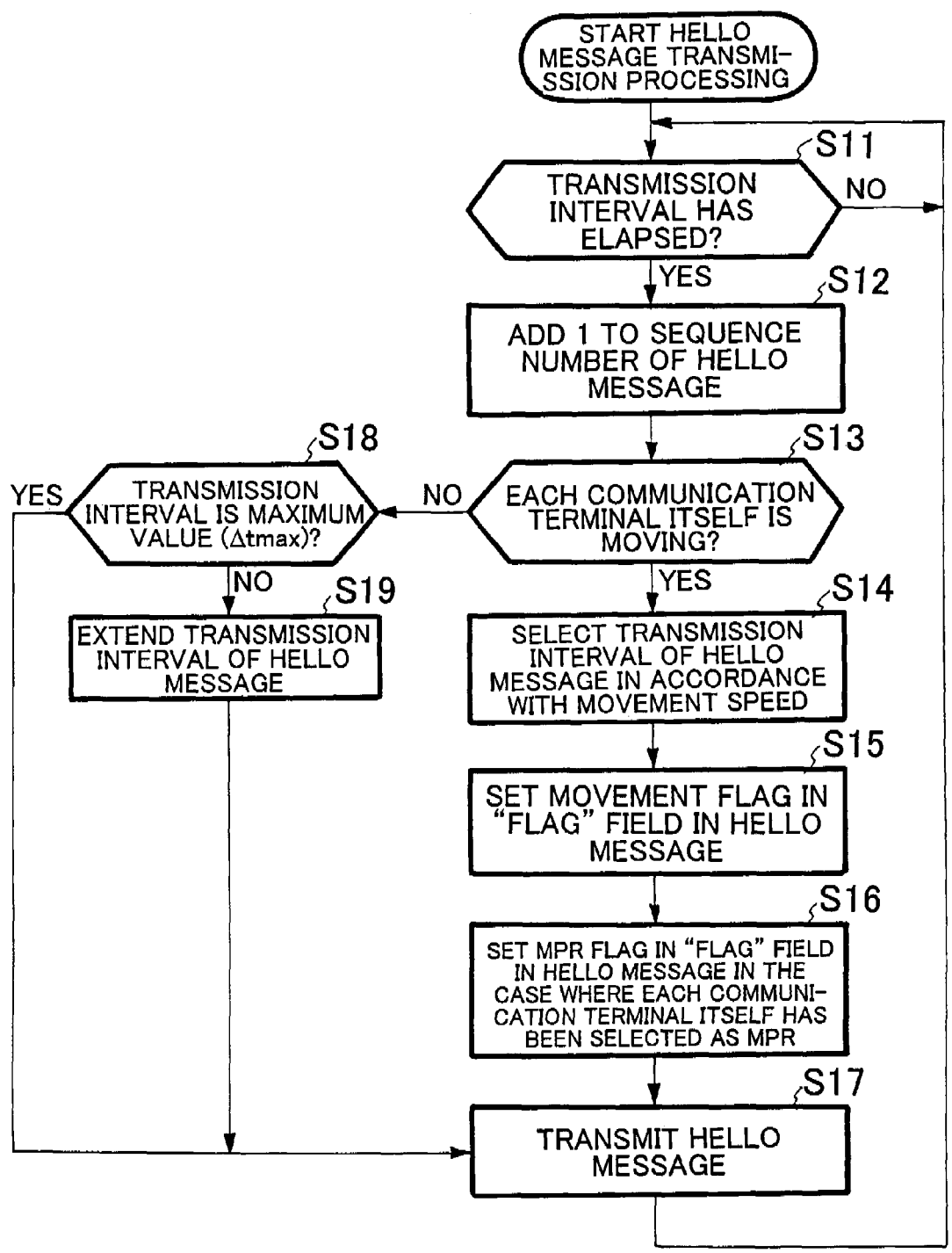
FIG. 15 is a flowchart for schematically explaining HELLO message transmission processing performed by the communication terminals shown in FIG. 1.

First, with reference to FIG. 15, HELLO massage transmission processing performed by the communication terminals 11 to 14 will be described.

Each of the communication terminals 11 to 14 determines whether the transmission interval that has previously been set has elapsed or not (step S11). Then, if the determination is YES (elapsed), each of the communication terminals 11 to 14 adds 1 to the sequence number of the HELLO message (step S12), while if the determination is NO, the flow returns to step S11.

Then, each of the communication terminals 11 to 14 determines whether each itself is moving or not based on the movement speed information detected by its own movement detection unit 25 (step S13). Then, if the determination is YES (moving), each of the communication terminals 11 to 14 selects the transmission interval of the HELLO message in accordance with the detected movement speed (step S14). This selection is made such that the control load becomes small in accordance with the movement speed of each of the communication terminals 11 to 14 itself. Specifically, each of the communication terminals 11 to 14 transmits a HELLO massage at a shorter transmission interval as the movement speed becomes higher. In this case, for example, a movement speed/message transmission interval correspondence table that previously defines a correspondence between the movement speed and transmission interval of the HELLO message is used. In the case where this correspondence table is used, the correspondence table is previously stored in a memory in the route control section 22 and referred to when a processor in the route control section 22 executes the control program. Thus, with reference to the correspondence table, the transmission interval of the HELLO message corresponding to the detected movement speed is selected.

Then, each of the communication terminals 11 to 14 sets a movement flag in the "flag" field in the HELLO message (step S15). Subsequently, in the case where each of the communication terminals 11 to 14 has been selected as an MPR node of any other terminals, it sets an MPR selection flag (MPR flag) in the "flag" field in the HELLO message (step S16). Then, each of the communication terminals 11 to 14 transmits the HELLO message in which such a flag has been set in the "flag" field (step S17), and the flow returns to the initial step S11.

If the determination in step S13 is NO (not moving), each of the communication terminals 11 to 14 determines whether the transmission interval of the HELLO message is a previously set maximum value $\Delta tmax$ (step S18). Then, if the determination is YES (transmission interval is the maximum value), the flow shifts to step S17 where each of the communication terminals 11 to 14 transmits the HELLO message at the maximum transmission interval. If the determination is NO (transmission interval is not the maximum value), each of the communication terminals 11 to 14 performs control so as to extend the transmission interval of the HELLO message (step S19). For example, this control is performed such that the transmission interval of the HELLO message is extended by a previously set incremental value. After that, the flow shifts to step S17 where each of the communication terminals 11 to 14 transmits the HELLO message at the transmission interval controlled as described above.

Figure 16:
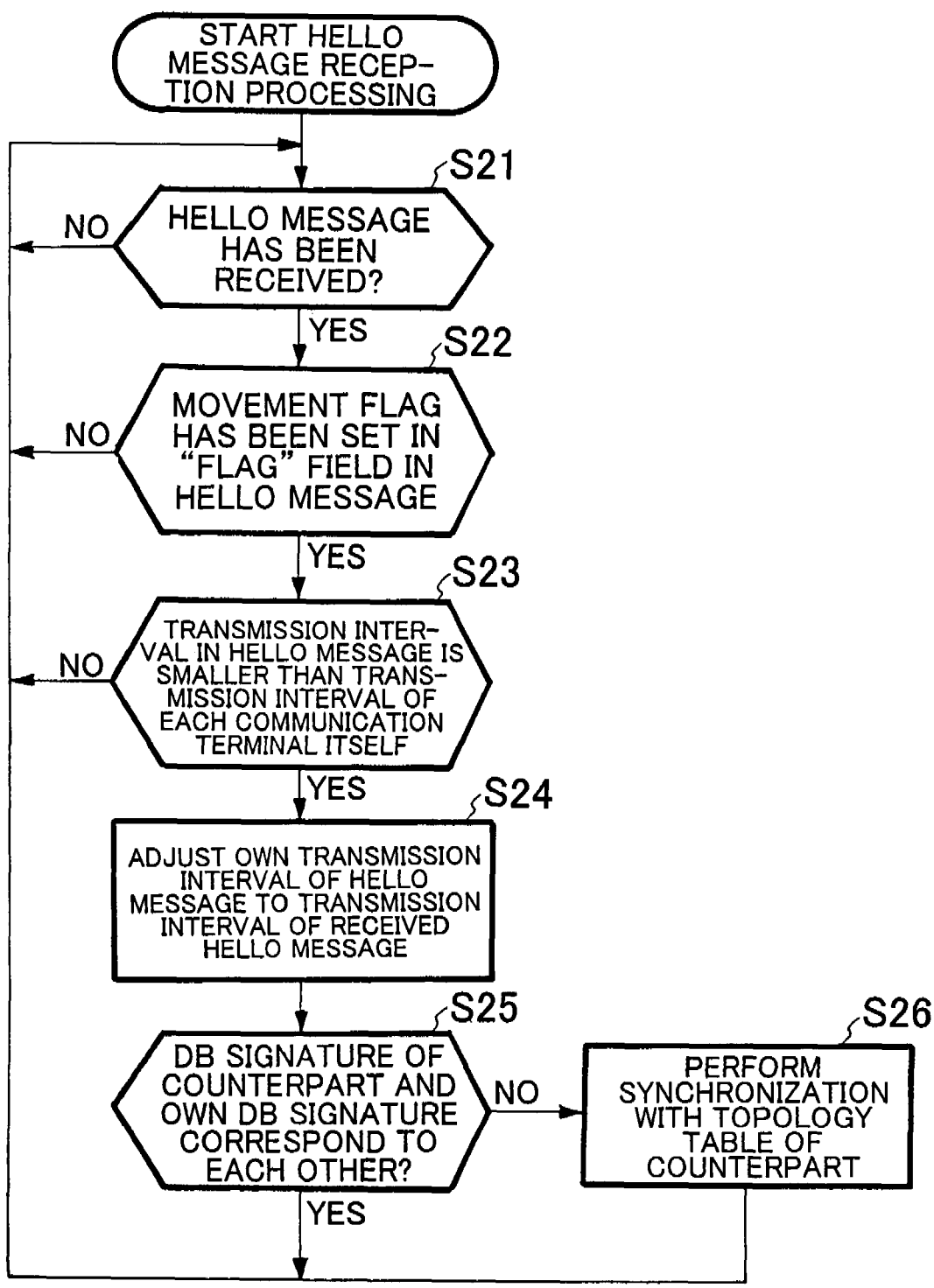
FIG. 16 is a flowchart for schematically explaining HELLO message reception processing performed by the communication terminals shown in FIG. 1.

Next, with reference to FIG. 16, HELLO massage reception processing performed by the communication terminals 11 to 14 will be described.

Each of the communication terminals 11 to 14 determines whether it has received the HELLO message (step S21). Then, if the determination is YES (received), each of the communication terminals 11 to 14 determines whether the movement flag has been set in the "flag" field in the HELLO message (step S22).

Then, if the determination is YES (movement flag has been set), each of the communication terminals 11 to 14 determines whether the transmission interval in the HELLO message is smaller than its own transmission interval (step S23). Then, if the determination is YES (transmission interval is smaller), each of the communication terminals 11 to 14 adjusts its own transmission interval of the HELLO message to the transmission interval of the received HELLO message (step S24). Then, each of the communication terminals 11 to 14 determines whether the DB signature in the HELLO massage of a counterpart and its own DB signature correspond to each other (step S25). Then, if the determination is NO (DB signatures do not correspond to each other), each of the communication terminals 11 to 14 performs synchronization with the topology table 24 of the counterpart (step S26), and the flow returns to the initial step S21. Also, in the case where the determination is NO in steps S21 to S23, or where the determination is YES in step S26, the flow returns to the initial step S21.

The DB signature is, as described above, a numerical value calculated using a predetermined calculation expression such as a hash function based on the content of the topology table 24. This information is included in the HELLO message, which makes it possible to determine whether the information of the topology table 24 of a neighboring node and information of own topology table 24 correspond to each other. In the present embodiment, the topology message is broadcasted at a large interval. Therefore, it is effective for a wireless node that newly enters the wireless multi-hop network to collectively receive the topology information from its neighboring nodes when acquiring link information of the entire network. To realize this, the present embodiment adopts a mechanism using the DB signature described above.

Figure 17:
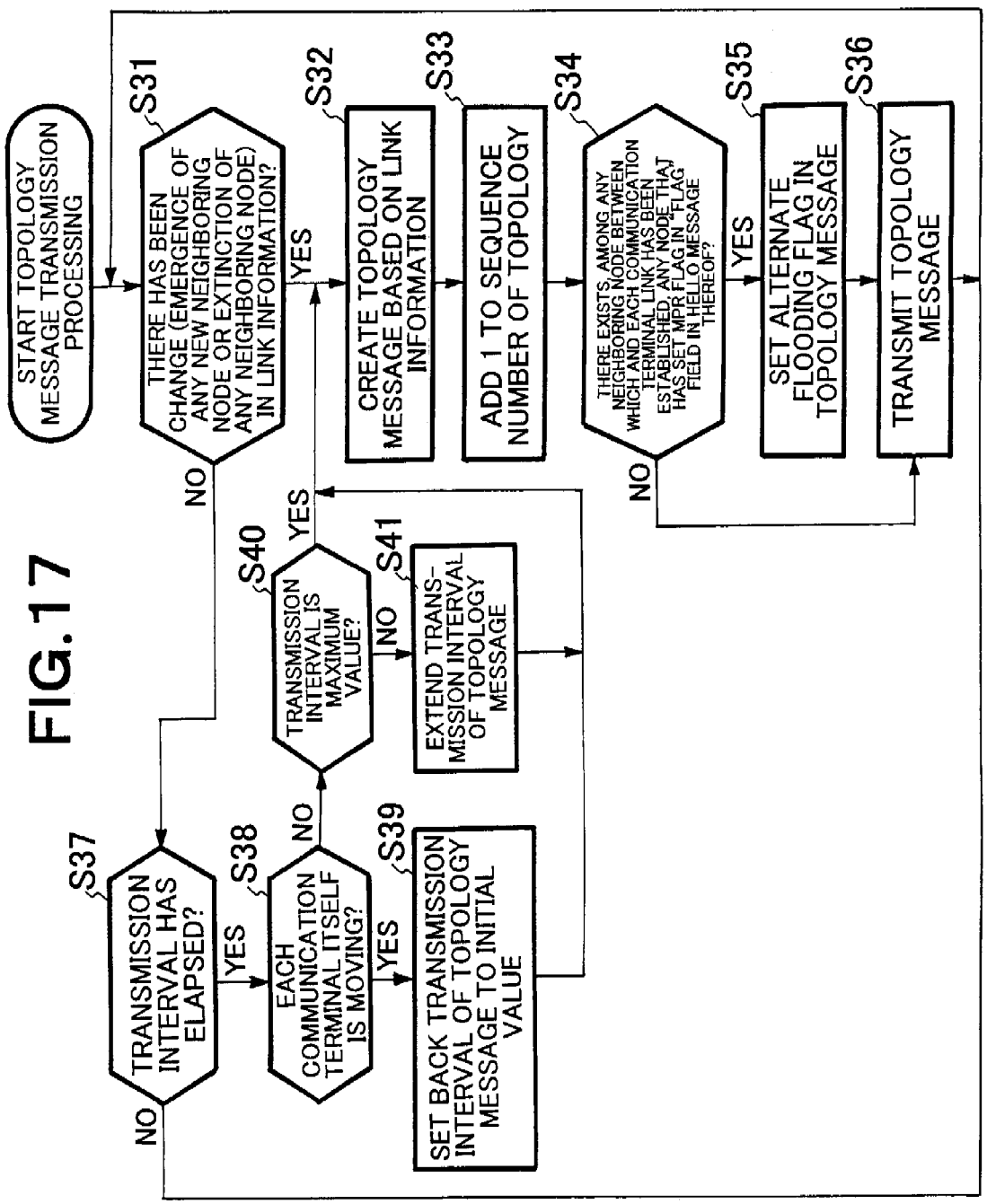
FIG. 17 is a flowchart for schematically explaining topology message transmission processing performed by the communication terminals shown in FIG. 1.

Next, with reference to FIG. 17, topology message transmission processing performed by the communication terminals 11 to 14 will be described.

Each of the communication terminals 11 to 14 refers to its own topology table 24 to determine whether there has been any change in the link information, that is, there has been detected emergence of any new neighboring node or extinction of any neighboring node (step S31).

Then, if the determination is YES (there has been any change in the link information), each of the communication terminals 11 to 14 creates a topology message based on the link information (step S32). Then, each of the communication terminals 11 to 14 adds 1 to the sequence number of the topology message (step S33).

Subsequently, each of the communication terminals 11 to 14 determines whether there exists, among any neighboring node with which a link has been established, any node that has set an MPR flag in the "flag" field in the HELLO message thereof (step S34). Then, if the determination is YES (exist), each of the communication terminals 11 to 14 sets an alternate flooding flag in the "flag" field in the topology message (step S35) and transmits this topology message (step S36). If the determination is NO (not exist), the flow shifts to step S36.

If the determination in step 31 is NO (there is no change in the link information), each of the communication terminals 11 to 14 determines a previously set transmission interval has elapsed (step S37). Then, if the determination is YES (elapsed), each of the communication terminals 11 to 14 determines whether each itself is moving or not based on the movement speed information detected by its own movement detection unit 25 (step S38).

Then, if the determination is YES (moving), each of the communication terminals 11 to 14 sets back the transmission interval of the topology message to an initial value (step S39), and the flow shifts to step S32. If the determination is NO (not moving), each of the communication terminals 11 to 14 determines whether the transmission interval of the topology message is a previously set maximum value (step S40). Then, if the determination is YES (transmission interval is the maximum value), the flow shifts to step S32. If the determination is NO (transmission interval is not the maximum value), each of the communication terminals 11 to 14 performs control so as to extend the transmission interval of the topology message (step S41), and the flow shifts to step S32.

Figure 18:
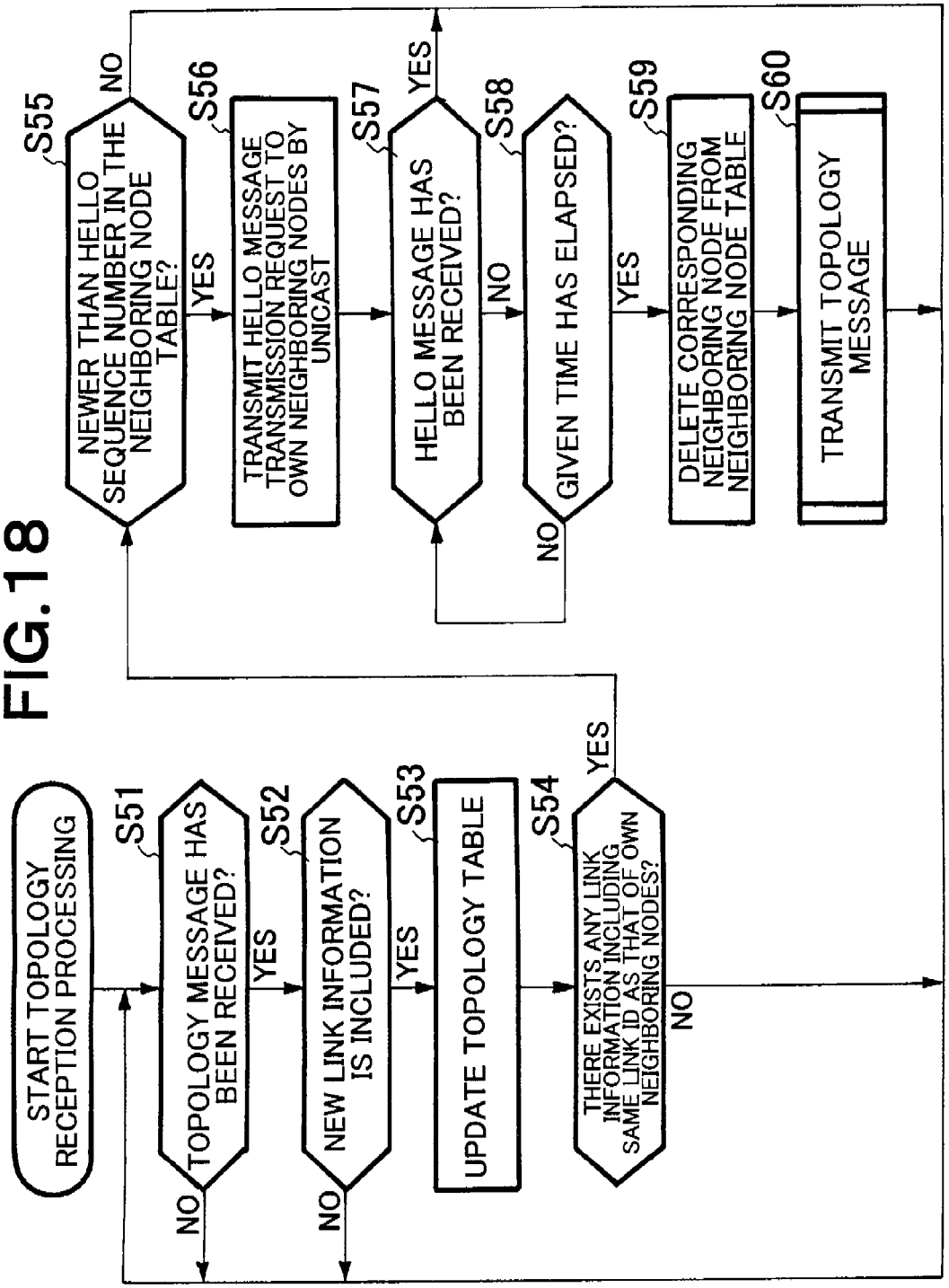
FIG. 18 is a flowchart for schematically explaining topology message reception processing performed by the communication terminals shown in FIG. 1.

Next, with reference to FIG. 18, topology message reception processing performed by the communication terminals 11 to 14 will be described.

Each of the communication terminals 11 to 14 determines whether it has received the topology message (step S51). Then, if the determination is YES (received), each of the communication terminals 11 to 14 determines whether new link information is included in the topology message (step S52).

Then, if the determination in step S52 is YES (new link information is included), each of the communication terminals 11 to 14 updates the topology table 24 according to the new link information (step S53). Then, each of the communication terminals 11 to 14 determines whether there exists any link information including the same link ID as that of the neighboring nodes thereof (step S54).

Then, if the determination in step S54 is YES (exist), each of the communication terminals 11 to 14 determines whether the HELLO sequence number of the neighboring node having the same link ID in the link information is newer than the HELLO sequence number in the neighboring node table 23 (step S55). Then, if the determination is YES (newer), each of the communication terminals 11 to 14 transmits a HELLO message transmission request to its neighboring nodes by unicast (step S56).

Thereafter, each of the communication terminals 11 to 14 determines whether it has received the HELLO message from its own neighboring nodes (step S57). Then, the determination is NO (not received), each of the communication terminals 11 to 14 determines whether a given time has elapsed (step S58). Then, if the determination is YES (elapsed), each of the communication terminals 11 to 14 deletes the information of the corresponding neighboring node from the neighboring node table 23 (step S59). Then, each of the communication terminals 11 to 14 transmits a topology message (step S60), and the flow returns to step S51.

Also, in the case where the determination is NO in steps S51, S52, S54, and S55, or where the determination is YES in step S57, the flow returns to step S51.

Thus, according to the present embodiment, the transmission interval of the control message is controlled in accordance with the movement state of each communication terminal. As a result, a communication terminal whose movement amount is small can transmit the control message at a longer interval to thereby suppress the amount of the control message to be exchanged in the entire network, enabling the communication route control method according to the present embodiment to be applied to a network exhibiting lower bandwidth capability.

Further, according to the present embodiment, when the link information is updated, the sequence number of the HELLO message is included in the topology message to be transmitted. This quickly eliminates inconsistency concerning the neighboring node occurring at the movement time, thereby continuing normal route control.

As described above, it is possible to realize route control in the wireless multi-hop network in accordance with a movement state while suppressing a control load.

Second Embodiment

In the above first embodiment, the message transmission interval is controlled in accordance with the movement speed of a communication terminal (node). On the other hand, the present embodiment exemplifies a case where the communication terminal is not provided with the movement speed detection function or a situation (e.g., in building interiors where GPS reception is not possible) does not allow a use of the movement speed detection function of the communication terminal, wherein the message transmission interval is controlled by a user's instruction (e.g., through depression of buttons on the communication terminal). Operations other than the above are the same as those of the first embodiment. Hereinafter, only a different point will be described.

A wireless multi-hop network system according to the present embodiment operates as follows.

A user who carries a communication terminal inputs information concerning conditions such as his or her movement speed, communication continuation demand level, and the like. This input operation is performed by the user operating through a not shown input unit provided on the communication terminal. As the information concerning own movement speed condition (movement state), condition items such as "walk", "train", "car (general road, expressway)", and the like are set so as to be input or selected through user's operation. Further, as the information concerning the communication continuation demand level condition, information corresponding to the conditions such as "communication state needs to be continued without interruption" "communication interruption is allowed once in a while", "communication may be disabled during movement", and the like are set so as to be input or selected through user's operation.

Subsequently, the communication terminal calculates an optimum transmission interval of the HELLO message based on the input conditions and then performs control. For example, a case where the own movement speed condition has been input will be described. In this case, for example, a correspondence between data corresponding to condition items such as "walk", "train", "car (general road, expressway)", and the like and setting values (predictive values) of the movement speed (average value) corresponding to the data is previously set in a correspondence table. Then, when any of conditions is input, the correspondence table is referred to, and a setting value of the movement speed is calculated in accordance with the data corresponding to the input condition. Then, a transmission interval of the HELLO message corresponding to the setting value of the movement speed is selected using a correspondence table like above. Alternatively, a correspondence between the data corresponding to condition items such as "walk", "train", "car (general road, expressway)", and the like and optimum transmission interval values of the HELLO message corresponding to the data is previously set in a correspondence table. Then, when any of conditions is input, the correspondence table is referred to, and the HELLO message transmission interval is selected in accordance with the data corresponding to the input condition. The correspondence table used here is retained, e.g., in a memory in the route control section.

Next, a case where the condition of the communication continuity demand level has been input will be described. In this case, for example, a correspondence between conditions items such as "communication state needs to be continued without interruption" "communication interruption is allowed once in a while", "communication may be disabled during movement" and optimum transmission interval values of the HELLO message corresponding to the condition items is previously set in a correspondence table. Then, when any of conditions is input, the correspondence table is referred to, and the HELLO message transmission interval corresponding to the condition is selected. The correspondence table used here is also retained, e.g., in a memory in the route control section.

Thus, according to the present embodiment, it is possible to obtain not only the same advantage as that of the first embodiment but also an advantage that the message transmission interval can be controlled even in the case where the communication terminal is not provided with the movement speed detection function or a situation does not allow a use of the movement speed detection function of the communication terminal.

Third Embodiment

In the above first embodiment, the message transmission interval is controlled in accordance with the movement speed of a communication terminal (node). On the other hand, the present embodiment exemplifies a case where the message transmission interval is controlled by an instruction from a network management node (network management apparatus). Operations other than the above are the same as those of the first embodiment. Hereinafter, only a different point will be described.

Figure 19:
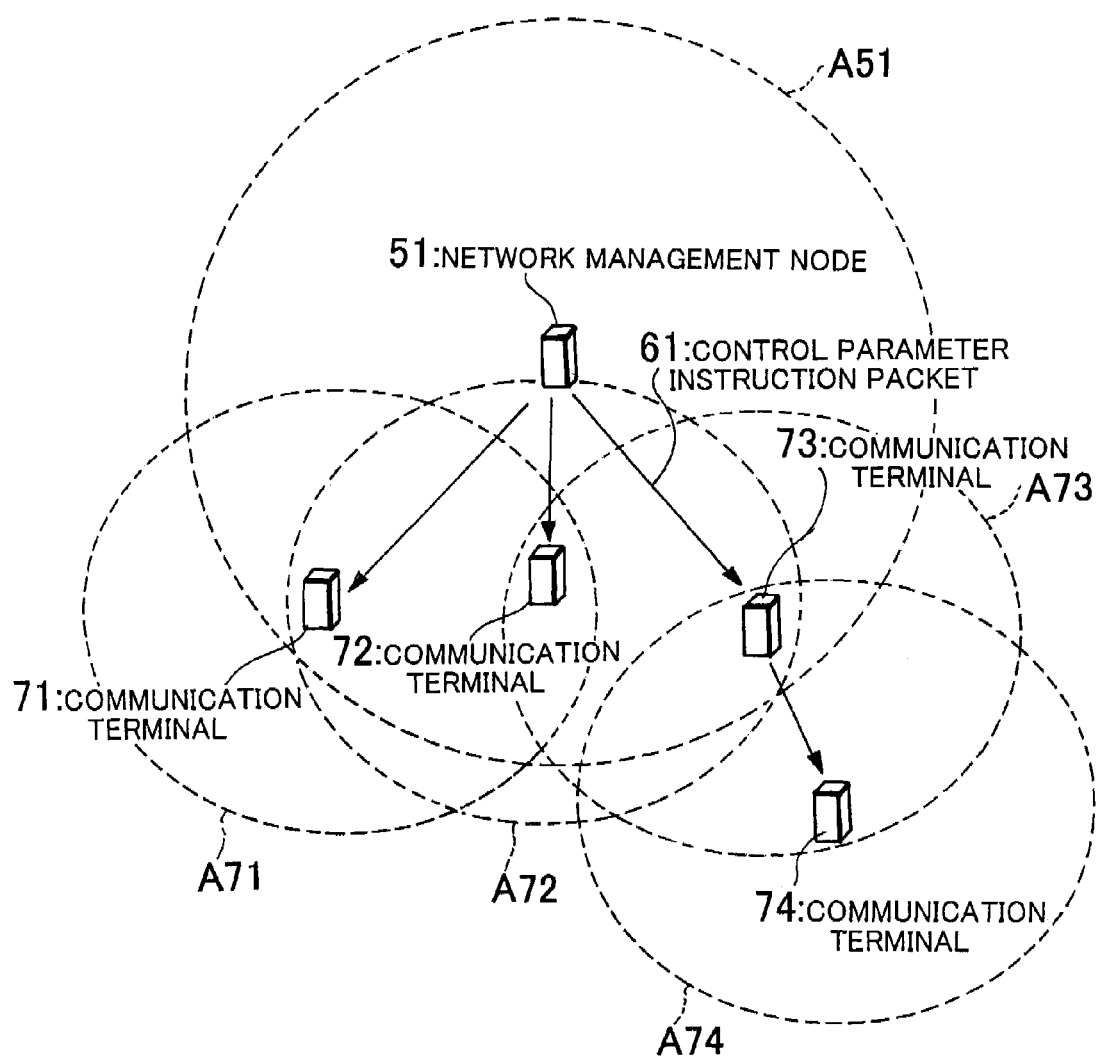
FIG. 19 is a view showing the entire configuration of a wireless multi-hop network according to a third embodiment of the present invention.

With reference to FIG. 19, a network configuration of a wireless multi-hop network system according to the present embodiment will be described.

In the wireless multi-hop network system shown in FIG. 19, a network management node 51 retains information concerning the number of terminals in the entire network and coverage areas of the terminals (a dotted circle A51 denotes a coverage area of the network management node 51). The network management node 51 collects the topology information of communication terminals 71 to 73 and stores information such as update frequency of a communication route. Based on the above information, the network management node 51 calculates control parameters such as an optimum HELLO message transmission interval for the network, topology message broadcast interval, and HELLO message transmission interval of the communication terminal. Further, the network management node 51 performs flooding of a control parameter instruction packet 61 including the calculated control parameter information throughout the network. At least a part of above functions of the network management node 51 is realized by, e.g., a computer executing a previously set program command.

The communication terminals 71 to 73 forwards the control parameter instruction packet 61 and also delivers a node (communication terminal 74) that cannot directly communicate with the network management node 51 by wireless signals (dotted circles A71 to A74 denote coverage areas of the respective communication terminals 71 to 74). Upon reception of the control parameter instruction packet, each of the communication terminals 71 to 74 controls the transmission interval of the HELLO message according to the received parameters. Thus, also in the present embodiment, it is possible to obtain the same advantage as that of the first embodiment.

Modification

The first embodiment is based on the method of Non-Patent Document 1. Alternatively, however, it is possible to achieve this embodiment as a modification based on the method of Non-Patent Document 2, that is, a method in which only a difference in a change in the communication route is transmitted so as to suppress the message load.

Further, although the message transmission interval is controlled in accordance with the movement speed of the communication terminal (node) in the first embodiment, a method in which the message transmission interval is controlled in accordance with a communication state of the communication terminal may also be achieved as another modification of the first embodiment. For example, in the case where a given communication terminal transmits data packet at frequent intervals, neighboring nodes of the communication terminal can confirm the existence of the communication terminal without receiving the HELLO message from the communication terminal. Thus, the communication terminal transmitting data packet at frequent intervals can extend the HELLO message transmission interval. In other words, the communication terminal performs control such that the larger the transmission frequency of the data packet, the smaller the HELLO message transmission frequency becomes. Operations other than the above are the same as those of the first embodiment. Thus, also in the present embodiment, it is possible to obtain the same advantage as that of the first embodiment.

At least a part of the functions that the respective sections of each communication terminal in the above embodiments have may be provided in a form of a program that a computer can execute. This program may be loaded to the computer from a recording medium, or through a communication network.

INDUSTRIAL APPLICABILITY

The present invention is applicable to a wireless multi-hop network system, its communication route control method, and a communication terminal.

The invention claimed is:

1. A communication route control method for a wireless multi-hop network which forms a multi-hop network in which control packets are exchanged by wireless signals between a plurality of communication terminals serving as nodes of the network, retains topology information of the multi-hop network, and controls communication routes of the packets exchanged between the communication terminals based on the topology information, said communication route control method comprising:

a step in which each of the communication terminals detects its own movement information including at least a movement speed;

a step in which each of the communication terminals controls the exchange frequency of the control packet to be exchanged with other communication terminals on the multi-hop network based on the detected movement information so as to reduce a control load in accordance with its movement state;

a step in which each of the communication terminals updates the topology information of the multi-hop network that each itself retains based on the control packets from the other communication terminals;

a step in which each of the communication terminals exchanges neighbor detection messages with neighboring communication terminals on the wireless multi-hop network as the control packets;

a step in which, when a link with each of the neighboring communication terminals has been established by the exchange of the neighbor detection message, each of the communication terminals retains, in addition to terminal identification information of each of the neighboring communication terminals, identification attribute information of the neighbor detection message received from each of the neighboring communication terminals at the time point when the link has been established as link information included in the topology information; and a step in which each of the communication terminals broadcasts, as the control packet, a network topology message including the link information composed of the terminal identification information of each of the neighboring communication terminals and identification attribute information of the neighbor detection message on the multi-hop network, wherein each of the communication terminals broadcasts said network topology message to be received by all other communication terminals on said multi-hop network.

2. The communication route control method for a wireless multi-hop network according to claim 1, further comprising:
a step in which each of the communication terminals receives instruction information from a user; and
a step in which each of the communication terminals controls the exchange frequency of the control packet according to the instruction information.

3. The communication route control method for a wireless multi-hop network according to claim 1, further comprising:
a step in which each of the communication terminals receives instruction information from a network management apparatus on the multi-hop network; and
a step in which each of the communication terminals controls the exchange frequency of the control packet according to the instruction information.

4. The communication route control method for a wireless multi-hop network according to claim 1, further comprising:
a step in which each of the communication terminals detects its own communication state including the transmission frequency of data packet; and
a step in which each of the communication terminals controls the exchange frequency of the control packet according to the communication state such that the higher the transmission frequency of the data packet, the lower the exchange frequency of the control packet becomes.

5. The communication route control method for a wireless multi-hop network according to claim 1, further comprising:
a step in which, when receiving the network topology message including the link information from each of the other communication terminals, each of the communication terminals compares the identification attribute information of the neighbor detection message included in the network topology message and identification attribute information of the neighbor detection message included in the link information that each of the communication terminals itself retains for each neighboring communication terminal; and
a step in which, in the case where the identification attribute information of the neighbor detection message included in the network topology message is newer than the identification attribute information of the neighbor detection message included in the link information that each of the communication terminals itself retains, each of the communication terminals updates the link information that each itself retains.

6. The communication route control method for a wireless multi-hop network according to claim 1, further comprising:
a step in which, when broadcasting the network topology message, each of the communication terminals selects a broadcast method of the network topology message in accordance with a state of a neighboring communication terminal that causes the link information included in the topology information to be changed.

7. The communication route control method for a wireless multi-hop network according to claim 1, characterized by further comprising:
a step in which, when receiving a topology message having a newer link information than the link information that each of the communication terminals itself retains, each of the communication terminals transmits a neighbor detection message transmission request to a neighboring communication terminal corresponding to the link information and confirms a connection with the neighboring communication terminal depending on presence/absence of a reply from the neighboring communication terminal.

8. A communication terminal for use in a wireless multi-hop network which forms a multi-hop network in which control packets are exchanged by wireless signals between a plurality of communication terminals serving as nodes of the network, retains topology information of the multi-hop network, and controls communication routes of the packets exchanged between the communication terminals based on the topology information, said communication terminal comprising:
means for detecting own movement information including at least a movement speed; means for controlling the exchange frequency of the control packet to be exchanged with other communication terminals on the multi-hop network based on the detected movement information so as to reduce a control load in accordance with its movement state;
means for updating the topology information of the multi-hop network that the communication terminal itself retains based on the control packets from the other communication terminals,
means for exchanging neighbor detection messages with neighboring communication terminals on the multi-hop network as the control packets;
means for, when a link with each of the neighboring communication terminals has been established by the exchange of the neighbor detection message, retaining, in addition to terminal identification information of each of the neighboring communication terminals, identification attribute information of the neighbor detection message received from each of the neighboring communication terminals at the time point when the link has been established as link information included in the topology information; and
means for broadcasting, as the control packet, a network topology message including the link information composed of the terminal identification information of each of the neighboring communication terminals and identification attribute information of the neighbor detection message on the wireless multi-hop network,
wherein each of the communication terminals broadcasts said network topology message to be received by all other communication terminals on said multi-hop network.

9. The communication terminal for use in a wireless multi-hop network according to claim 8, further comprising:
means for receiving instruction information from a user; and
means for controlling the exchange frequency of the control packet according to the instruction information.

10. The communication terminal for use in a wireless multi-hop network according to claim 8, further comprising:
means for receiving instruction information from a network management apparatus on the multi-hop network; and
means for controlling the exchange frequency of the control packet according to the instruction information.

11. The communication terminal for use in a wireless multi-hop network according to claim 8, further comprising:
means for detecting its own communication state including the transmission frequency of data packet; and means for controlling the exchange frequency of the control packet according to the communication state such that the higher the transmission frequency of the data packet, the lower the exchange frequency of the control packet becomes.

12. The communication terminal for use in a wireless multi-hop network according to claim 8, further comprising:

means for, when receiving the network topology message including the link information from each of the other communication terminals, comparing the identification attribute information of the neighbor detection message included in the network topology message and identification attribute information of the neighbor detection message included in the link information that the communication terminal itself retains for each neighboring communication terminal; and means for, in the case where the identification attribute information of the neighbor detection message included in the network topology message is newer than the identification attribute information of the neighbor detection message included in the link information that the communication terminal itself retains, updating the link information that the communication terminal itself retains.

13. The communication terminal for use in a wireless multi-hop network according to claim 12, further comprising:

means for, when receiving a topology message having a newer link information than the link information that the communication terminal itself retains, for transmitting a neighbor detection message transmission request to a neighboring communication terminal corresponding to the link information and confirms a connection with the neighboring communication terminal depending on presence/absence of a reply from the neighboring communication terminal.

14. The communication terminal for use in a wireless multi-hop network according to claim 8, further comprising:

means for, when broadcasting the network topology message, selecting a broadcast method of the network topology message in accordance with a state of a neighboring communication terminal that causes the link information included in the topology information to be changed.

15. A wireless multi-hop network which includes a plurality of communication terminals, forms a multi-hop network in which control packets are exchanged by wireless signals between the communication terminals serving as nodes of the network, retains topology information' of the multi-hop network, and controls communication routes of the packets exchanged between the communication terminals based on the topology information, wherein each of the communication terminals comprises: means for detecting own movement information including at least a movement speed; means for controlling the exchange frequency of the control packet to be exchanged with other communication terminals on the multi-hop network based on the detected movement information so as to reduce a control load in accordance with its movement state;

means for updating the topology information of the multi-hop network that the communication terminal itself retains based on the control packets from the other communication terminals, a step in which each of the communications terminals exchanges neighbor detection messages with neighboring communications terminals on the multi-hop network as the control packets;

a step in which, when a link with each of the neighboring communication terminals has been established by the exchange of the neighbor detection message, each of the communication terminals retains, in addition to terminal identification information of each of the neighboring communication terminals, identification attribute information of the neighbor detection message received from each of the neighboring communication terminals at the time point when the link has been established as link information included in the topology information; and a step in which each of the communications terminals broadcasts, as the control packet, a network topology message including the link information composed of the terminal identification information of each of the neighboring communication terminals and identification attribute information of the neighbor detection message on the multi-hop network, wherein each of the communication terminals broadcasts said network topology message to be received by all other communication terminals on said multi-hop network.

16. An operation program embodied on a non-transitory recording medium of a communication terminal for use in a wireless multi-hop network system which forms a multi-hop network in which control packets are exchanged by wireless signals between a plurality Of communication terminals serving as nodes of the network, retains topology information of the multi-hop network, and controls communication routes of the packets exchanged between the communication terminals based on the topology information, characterized by allowing a computer to execute the steps of:

detecting movement information of each of the communication terminals itself, including at least a movement speed;

controlling the exchange frequency of the control packet to be exchanged with other communication terminals on the multi-hop network based on the detected movement information so as to reduce a control load in accordance with the movement state of each of the communication terminals itself;

updating the topology information of the multi-hop network that each of the communication terminals itself retains based on the control packets from the other communication terminals, means for exchanging neighbor detection messages with neighboring communication terminals on the multi-hop network as the control packets;

means for, when a link with each of the neighboring communication terminals has been established by the exchange of the neighbor detection message, retaining, in addition to terminal identification information of each of the neighboring communication terminals, identification attribute information of the neighbor detection message received from each of the neighboring communication terminals at the time point when the link has been established as link information included in the topology information; and means for broadcasting, as the control packet, a network topology message including the link information composed of the terminal identification information of each of the neighboring communication terminals and identification attribute information of the neighbor detection message on the multi-hop network, wherein each of the communication terminals broadcasts said network topology message to be received by all other communication terminals on said multi-hop network.

* * * * *